United States Patent Office 3,816,409
Patented June 11, 1974

3,816,409
5-(PYRIDYL OR PHENYL) - 1H - 2,3,4,5 - TETRA-HYDRO - 1,5 - BENZODIAZEPIN - 4 - ONES AND SALTS THEREOF
Adolf Bauer, Ingelheim am Rhein, Karl Heinz Weber, Gau-Algesheim, Herbert Merz and Karl Zeile, Ingelheim am Rhein, Rolf Giesemann, Bingen (Rhine), and Peter Danneberg, Ingelheim am Rhein, Germany, assignors to Boehringer Ingelheim GmbH, Ingelheim am Rhein, Germany
No Drawing. Continuation-in-part of abandoned application Ser. No. 44,571, June 8, 1970. This application May 24, 1972, Ser. No. 256,353
Int. Cl. C07d 53/04
U.S. Cl. 260—239.3 B          8 Claims

ABSTRACT OF THE DISCLOSURE

Compounds of the formula

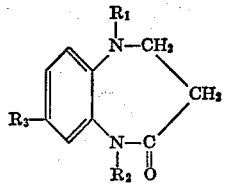

wherein $R_1$ is hydrogen, acyclic hydrocarbyl of 1 to 6 carbon atoms, ω-hydroxy-alkyl of 2 to 3 carbon atoms, cycloalkyl of 3 to 6 carbon atoms—methyl or formyl, $R_2$ is α-pyridyl, phenyl, o-halo-phenyl, o-nitro-phenyl or o-trifluoromethyl-phenyl, and $R_3$ is bromine, hydroxyl, trifluoromethyl, nitro, cyano or, when $R_1$ is ω-hydroxy-alkyl of 2 to 3 carbon atoms or formyl or, when $R_2$ is o-fluoro-phenyl, o-bromophenyl, o-nitrophenyl, o-trifluoromethylphenyl or α-pyridyl, also chlorine, and nontoxic, pharmacologically acceptable acid addition salts thereof; the compounds as well as their salts are useful as sedatives (tranquilizers) and anticonvulsives in warm-blooded animals.

---

This is a continuation-in-part of copending application Ser. No. 44,571, filed June 8, 1970, now abandoned.

This invention relates to a novel class of 5-(pyridyl or phenyl)-1H-2,3,4,5-tetrahydro - 1,5 - benzodiazepin-4-ones and non-toxic acid addition salts thereof, as well as to methods of preparing these compounds.

More particularly, the present invention relates to compounds of the formula

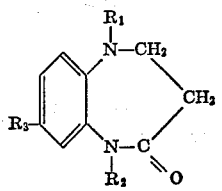

wherein $R_1$ is hydrogen, acyclic hydrocarbyl of 1 to 6 carbon atoms, ω-hydroxy-alkyl of 2 to 3 carbon atoms, cycloalkyl of 3 to 6 carbon atoms—methyl or formyl, $R_2$ is α-pyridyl, phenyl, o-halo-phenyl, o-nitrophenyl or o-trifluoromethyl-phenyl, and $R_3$ is bromine, hydroxyl, trifluoromethyl, nitro, cyano or, when $R_1$ is ω-hydroxy-alkyl of 2 to 3 carbon atoms or formyl or, when $R_2$ is o-fluorophenyl, o-bromophenyl, o-nitrophenyl, o-trifluoromethylphenyl or α-pyridyl, also chlorine, and non-toxic, pharmacologically acceptable acid addition salts thereof.

The compounds of the formula I may be prepared by various methods involving well known chemical principles, among which the following have proved to be most convenient and efficient:

Method A

By reacting a benzodiazepinone of the formula

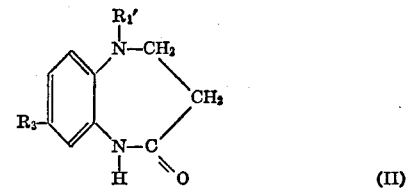

wherein $R_1'$ is hydrogen, acyclic hydrocarbyl of 1 to 6 carbon atoms, ω-hydroxy-alkyl of 2 to 3 carbon atoms or cycloalkyl of 3 to 6 carbon atoms—methyl, and $R_3$ has the same meanings as in formula I, with a compound of the formula $$R_2—X \qquad (III)$$

wherein $R_2$ has the same meanings as in formula I and X is halogen, in the presence of copper and an alkali metal acetate at elevated temperatures, and in an autoclave, if required. The reaction is favorably influenced by the presence of a copper salt, such as a cuprous salt or cupric oxide (CuO); a weak organic base, such as pyridine; and/or an organic solvent which is inert toward the reaction components, such as xylene.

Method B

By cyclization of an N,N'-disubstituted o-phenylenediamine of the formula

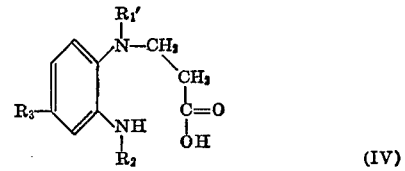

wherein $R_1'$ has the same meanings as in formula II, and
$R_2$ and $R_3$ have the same meanings as in formula I.

The cyclization is effected by first converting a compound of the formula IV into a reactive derivative thereof, such as an ester, an acid chloride or a mixed anhydride, pursuant to conventional methods for activation of a carboxylic acid (see, for example, Schröder and Lübke, The Peptides, Vol. I, pp. 76 et seq.; Academic Press, New York and London), and converting the said reactive derivative into the corresponding benzodiazepinone by heating the former in the presence of a basic condensation agent, if desired.

Method C

By cyclization of an N-acylated o-phenylenediamine of the formula

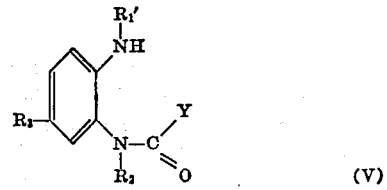

wherein $R_1'$ has the same meanings as in formula II,
$R_2$ and $R_3$ have the same meanings as in formula I, and
Y is vinyl or β-halo-ethyl.

The cyclization is effected by subjecting a compound of the formula V to elevated pressure in an autoclave or refluxing the same; in either case, the procedure is carried out in the presence of an inorganic or organic base, or of a catalytic acid compound, such as a dilute mineral acid, p-toluenesulfonic acid, aluminum chloride, zinc chloride or the like, and, if required, in the presence of an inert organic solvent, such as a lower alkanol, a lower carboxylic acid, tetrahydrofuran or the like.

Method D

By alkylating a benzodiazepinone of the formula

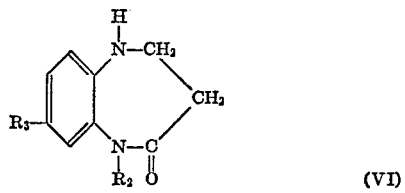

(VI)

wherein $R_2$ and $R_3$ have the same meanings as in formula I, with a conventional alkylating agent of the formula

$$R_1''\text{---}X \qquad (VII)$$

wherein $R_1''$ is acyclic hydrocarbyl of 1 to 6 carbon atoms, ω-hydroxy-alkyl of 2 to 3 carbon atoms, cycloalkyl of 3 to 6 carbon atoms—methyl or formyl, and X is an anionically easily removable acid radical, such as halogen or toluenesulfonyl, optionally in the presence of a basic condensation agent, such as sodium amide or sodium alcoholate.

In those instances where $R_1''$ in compound VII is ω-hydroxy-alkyl, the alkylation is preferably carried out in the presence of a weak organic or inorganic base and advantageously at elevated temperatures, if necessary in an autoclave. Under certain circumstances the addition of an inert organic solvent, such as a higher or lower alkanol, is desirable.

The introduction of a β-hydroxy-ethyl substituent into the 1-position of compound VI may also be effected by reacting a compound of the formula VI with ethylene oxide in the presence of a strong base, such as a methanolic 35% solution of benzyl-trimethylammonium hydroxide (Triton B), and optionally in the presence of an inert aqueous or anhydrous organic solvent or solvent mixture.

If $R_1''$ is formyl, the reaction is effected by heating a compound of the formula VI in formic acid.

The starting compounds for methods A through D are either known or may be readily prepared by the following methods:

A compound of the formula II may be prepared by reducing the nitro group of a compound of the formula

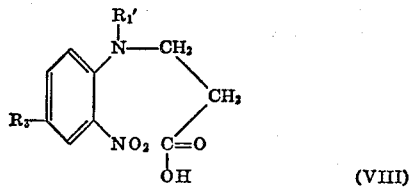

(VIII)

wherein $R_1'$ has the same meanings as in formula II, and
$R_3$ has the same meanings as in formula I, with nascent hydrogen generated by a mixture of zinc and hydrochloric acid; in general, the diazepine ring closure takes place simultaneously under these conditions.

If another reducing agent is used which does not simultaneously close the diazepine ring, the ring closure may subsequently be effected by the cyclization procedure described in method B above. If $R_3$ in formula VIII is also nitro, the nitro group shown in formula VIII above may be selectively reduced with ammonium sulfide.

A compound of the formula VIII, in turn, may be prepared by subjecting a correspondingly substituted 2-nitro-aniline to an addition reaction with acrylic acid.

A compound of the formula IV may be prepared by reducing the nitro group of an arylamino-2-nitro-benzene of the formula

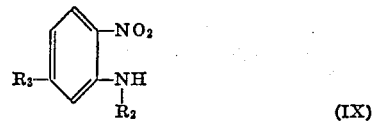

(IX)

wherein $R_2$ and $R_3$ have the same meanings as in formula I, and subjecting the reduction product to an addition reaction with acrylic acid.

A compound of the formula V may be prepared by acylating a correspondingly substituted o-diamino-benzene of the formula

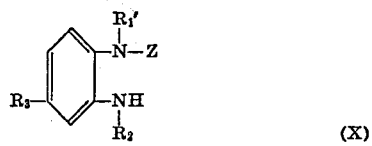

(X)

wherein $R_1'$ has the same meanings as in formula II,
$R_2$ and $R_3$ have the same meanings as in formula I, and
Z is an easily removable protective group, such as benzyl, acyl or carboxyalkyl, followed by removal of the protective group. The removal of the protective group may be effected by hydrolysis; it may also be effected by hydrogenation, except in those cases where $R_3$ is nitro.

A compound of the formula VI may be prepared by methods A, B or C, provided $R_1'$ in each of formulas II, IV and V is hydrogen.

The compounds embraced by formula I, with the exception of those wherein $R_2$ is formyl, are capable of forming monobasic acid addition salts by virtue of their amine-amide structure. Acids suitable for formation of non-toxic such acid addition salts are hydrohalic acids, sulfuric acid, methanesulfonic acid or the like.

The following examples further illustrate the present invention and will enable others skilled in the art to understand it more completely. It should be understood, however, that the invention is not limited solely to the particular examples given below.

EXAMPLE 1

Preparation of 1-(2'-butenyl)-7-nitro-5-phenyl-1H-2,3,4,5-tetrahydro-1,5-benzodiazepin-4-one by Method D 6 gm. of 7-nitro-5-phenyl-1H-2,3,4,5-tetrahydro-1,5-benzodiazepin-4-one were dissolved in a mixture of 20 ml. dry dimethylformamide and 30 ml. absolute tetrahydrofuran, 1.5 gm. sodium amide were added to the solution, and the mixture was stirred at room temperature for one hour. Thereafter, 12 gm. of crotyl bromide were added, and the reaction mixture was allowed to stand first for two hours at room temperature and then for three hours at 40° C. Subsequently, 5 ml. of methanol were added, the solution was neutralized with glacial acetic acid and evaporated in vacuo, the residue was taken up in 50 ml. of water, and the aqueous solution was extracted with methylene chloride. The oily product was separated from unreacted starting material by column-chromatography on silica gel, using ethylacetate/ cyclohexane (70:30) as the elution solvent, and the product was crystallized from isopropylether. 4.5 gm. (63% of theory) of 1-(2'-butenyl)-7-nitro-5-phenyl-1H-2,3,4,5-tetrahydro-1,5-benzodiazepin-4-one, M.P. 135–137° C., of the formula

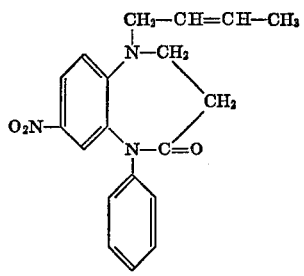

were obtained.

EXAMPLE 2

Preparation of 7-bromo-1-(β-hydroxy-ethyl)-5-phenyl-1H-2,3,4,5-tetrahydro - 1,5 - benzodiazepin-4-one by Method D 10 gm. of 7-bromo-5-phenyl-1H-2,3,4,5-tetrahydro-1,5-benzodiazepin-4-one were dissolved in a mixture of 500 ml. methanol and 50 ml. water, the solution was admixed with 75 ml. of ethyleneoxide and 0.5 ml. of N,N,N-trimethyl-N-benzyl-ammonium hydroxide (Triton B), and the mixture was heated for 90 hours at 45° C. Thereafter, the reaction mixture was evaporated in vacuo, and the residue was crystallized from water. 7.3 gm. (64% theory) of 7-bromo-1-(β-hydroxy-ethyl)-4-phenyl-1H-2,3,4,5-tetrahydro-1,5-benzodiazepin-4-one, M.P. 154–155° C. (recrystallized from methanol), of the formula

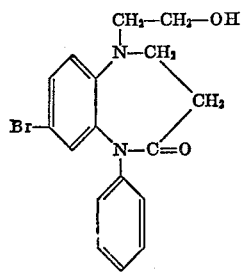

were obtained.

EXAMPLE 3

Preparation of 1-(β-hydroxy-ethyl) - 5 - phenyl - 7 -trifluoromethyl -1H - 2,3,4,5 - tetrahydro - 1,5 - benzodiazepin-4-one by Method D 10 gm. of 5-phenyl - 7 - trifluoromethyl - 1H - 2,3,4,5-tetrahydro - 1,5 - benzodiazepin - 4 - one were reacted with ethyleneoxide in aqueous methanol, as described in Example 2. Thereafter, unreacted starting material and impurities were removed from the raw product by column-chromatography on silicagel (elution agent: Ethylacetate/cyclohexane=75/25), and the purified product was crystallized by stirring with ether. 3.1 gm. (27% of theory) of 1-(β-hydroxy-ethyl) - 5 - phenyl - 7 - trifluoromethyl-1H - 2,3,4,5 - tetrahydro - 1,5 - benzodiazepin - 4 - one, M.P. 91–92° C., of the formula

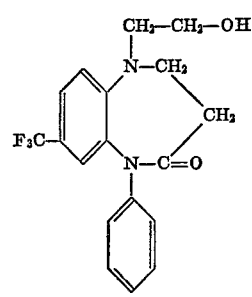

were obtained.

EXAMPLE 4

Preparation of 7 - bromo - 1 - (γ - hydroxy-propyl)-5-phenyl - 1H - 2,3,4,5 - tetrahydro - 1,5 - benzodiazepin-4-one by Method D A mixture consisting of 6.4 gm. of 7-bromo-5-phenyl-1H - 2,3,4,5 - tetrahydro - 1,5 - benzodiazepin - 4 - one, 6 gm. of potassium bicarbonate, 50 mgm. of potassium iodide and 30 ml. of 1-bromo-propanol-3 was heated for six hours at 100° C. Thereafter, the reaction mixture was evaporated in vacuo, the residue was taken up in methylene chloride, and the resulting solution was extracted with water, dried with magnesium sulfate and evaporated in vacuo. The raw product was purified by chromatography and crystallization as in Example 9. 1.2 gm. (15.8% of theory) of 7-bromo - 1 - (γ-hydroxy-n-propyl)-5-phenyl-1H - 2,3,4,5 - tetrahydro - 1,5 - benzodiazepin - 4 - one, M.P. 161–163° C., of the formula

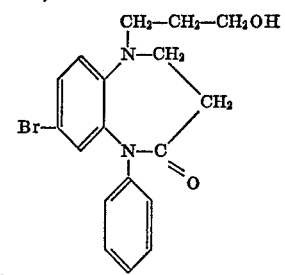

were obtained.

EXAMPLE 5

Preparation of 7-bromo - 1 - (β-hydroxy-ethyl)-5-phenyl-1H - 2,3,4,5 - tetrahydro - 1,5 - benzodiazepin - 4 - one by Method A A mixture consisting of 6 gm. of 7-bromo - 1 - (β-hydroxy-ethyl)-1H-2,3,4,5 - tetrahydro - 1,5 - benzodiazepin-4-one, 20 ml. of bromobenzene, 20 ml. of diethyleneglycol dimethyl ether, 6 gm. of potassium acetate, 1 gm. of cuprous chloride and 6 gm. of CuO was refluxed for three hours while vigorously stirring the same. Thereafter, activated charcoal was added to the reaction mixture, the mixture was vacuum-filtered through diatomaceous earth while still hot, the filter cake was washed with methylene chloride, the filtrate was evaporated in vacuo, and the residue was recrystallized from methanol. 3.4 gm. (51% of theory) of 7-bromo - 1 - (β-hydroxy-ethyl)-5-phenyl-1H - 2,3,4,5 - tetrahydro - 1,5 - benzodiazepin - 4 - one, M.P. 153–154° C., were obtained.

EXAMPLE 6

Preparation of 7-bromo-1-formyl-5-phenyl-1H-2,3,4,5-tetrahydro-1,5-benzodiazepin-4-one by Method D A mixture consisting of 4 gm. of 7-bromo-5-phenyl-1H-2,3,4,5-tetrahydro-1,5-benzodiazepin-4-one and 50 ml. of aqueous 85% formic acid was refluxed for 3 hours. Thereafter, the reaction solution was diluted with ice water, neutralized with ammonia, extracted with methylene chloride, dried with magnesium sulfate and evaporated. The residue was crystallized from ether, yielding 3.4 gm. (78% of theory) of 7-bromo-1-formyl-5-phenyl - 1H - 2,3,4,5-tetrahydro-1,5-benzodiazepin-4 - one, M.P. 158–159° C. (recrystallized from acetone/isopropylether), of the formula

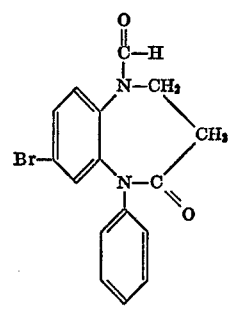

EXAMPLE 7

Preparation of 7-chloro-5-(o-nitro-phenyl)-1H-2,3,4,5-tetrahydro-1,5-benzodiazepin-4-one by Method A A mixture consisting of 10 gm. of 7-chloro-1H-2,3,4,5-tetrahydro-1,5-benzodiazepin-4-one, 26 ml. of o-bromo-nitrobenzene, 50 ml. of pyridine, 10 gm. of powdered copper, 1 gm. of cuprous chloride and 10 gm. of potassium acetate was placed into an autoclave, the autoclave was closed, and its contents were heated for six hours at 160° C. Thereafter, the contents of the autoclave were vacuum-filtered through diatomaceous earth, the filter cake was washed with methylene chloride, the filtrate was evaporated in vacuo, the residue was admixed with 50 ml. of concentrated ammonia, and the mixture was extracted with methylene chloride. The alkaline phase was dried with magnesium sulfate and evaporated in vacuo, and the residue was purified with activated charcoal, and crystallized from methylene chloride/isopropyl ether, yielding 61% of theory of 7-chloro-5-(o-nitro-phenyl)-1H-2,3,4,5-tetrahydro-1,5-benzodiazepin-4-one, M.P. 171–172° C., of the formula

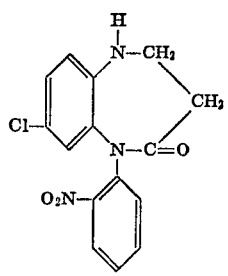

EXAMPLE 8

Using a procedure analogous to that described in Example 7, 5 - phenyl-7-trifluoromethyl-1H-2,3,4,5-tetrahydro-1,5-benzodiazepine-4-one, M.P. 152–153° C. was prepared from 7 - trifluoromethyl-1H-2,3,4,5-tetrahydro-1,5-benzodiazepin-4-one and bromobenzene.

EXAMPLE 9

Using a procedure analogous to that described in Example 7, 5-(o-chloro-phenyl)-7-trifluoromethyl-1H-2,3,4, 5-tetrahydro-1,5-benzodiazepin-4-one, M.P. 134° C., was prepared from 7trifluoromethyl-1H-2,3,4,5-tetrahydro-1,5-benzodiazepin-4-one and o-dichlorobenzene.

EXAMPLE 10

Using a procedure analogous to that described in Example 7, 5-(α-pyridyl)-7-trifluoromethyl-1H-2,3,4,5-tetrahydro-1,5-benzodiazepin-4-one, M.P. 150–152° C., of the formula

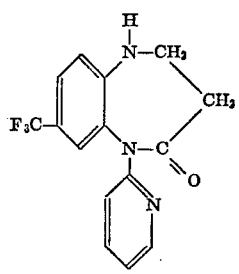

was prepared from 7trifluoromethyl-1H-2,3,4,5-tetrahydro-1,5-benzodiazepin-4-one and α-bromo-pyridine.

EXAMPLE 11

Using a procedure analogous to that described in Example 7, 5-(o-nitro-phenyl)-7-trifluoromethyl-1H-2,3,4,5-tetrahydro-1,5-benzodiazepin-4-one, M.P. 156° C., was prepared from 7-trifluoromethyl-1H-2,3,4,5-tetrahydro-1,5-benzodiazepin-4-one and o-bromo-nitrobenzene.

EXAMPLE 12

Using a procedure analogous to that described in Example 7, 5 - phenyl-7-nitro-1H-2,3,4,5-tetrahydro-1,5-benzodiazepin-4-one, M.P. 241° C., was prepared from 7-nitro-1H,2,3-4,5-tetrahydro - 1,5 - benzodiazepin-4-one and bromobenzene.

EXAMPLE 13

Using a procedure analogous to that described in Example 7, 5-(o-chloro-phenyl) - 7 - nitro-1H-,2,3,4,5-tetrahydro-1,5-benzodiazepin-4-one, M.P. 232–233° C., was prepared from 7-nitro-1H-2,3,4,5-tetrahydro-1,5-benzodiazepin-4-one and o-dichlorobenzene.

EXAMPLE 14

Using a procedure analogous tot hat described in Example 7, 5-(o-nitro-phenyl)-7-nitro-1H-2,3,4,5-tetrahydro-1,5-benzodiazepin-4-one, M.P. 233–235° C., was prepared from 7 - nitro-1H-2,3,4,5-tetrahydro-1,5-benzodiazepin-4-one and o-nitro-chlorobenzene.

EXAMPLE 15

Using a procedure analogous to that described in Example 1, 1-isopropyl-5-phenyl-7-nitro-1H-2,3,4,5-tetrahydro-1,5-benzodiazepin-4-one, M.P. 170–171° C., of the formula

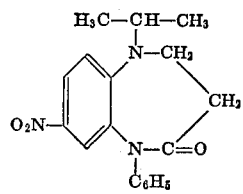

was prepared from 7-nitro-5-phenyl-1H-2,3,4,5-tetrahydro-1,5-benzodiazepin-4-one and isopropyl iodide.

EXAMPLE 16

Using a procedure analogous to that described in Example 1, 1-allyl-5-phenyl-7-trifluoromethyl-1H-2,3,4,5-tetrahydro-1,5-benzodiazepin-4-one, M.P. 144–145° C., was prepared from 5-phenyl-7 - trifluoromethyl-1H-2,3,4,5-tetrahydro-1,5-benzodiazepin-4-one and allyl bromide.

EXAMPLE 17

Using a procedure analogous to that described in Example 1, 1-ethyl-5-phenyl-7-nitro-1H-2,3,4,5-tetrahydro-1,5-benzodiazepin-4-one, M.P. 160–162° C., of the formula

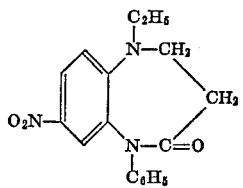

was prepared from 7-nitro-5-phenyl-1H-2,3,4,5-tetrahydro-1,5-benzodiazepin-4-one and ethyl iodide.

EXAMPLE 18

Using a procedure analogous to that described in Example 1, 1-allyl-5-phenyl-7-nitro-1H-2,3,4,5-tetrahydro-1,5-benzodiazepin-4-one, M.P. 126–127° C., was prepared from 7-nitro-5-phenyl-1H-2,3,4,5-tetrahydro-1,5-benzodiazepin-4-one and allyl bromide.

EXAMPLE 19

Using a procedure analogous to that described in Example 1, 1-propargyl-5-(o-chloro-phenyl)-7-nitro-1H-2,3,4,5-tetrahydro-1,5-benzodiazepin-4-one, M.P. 168–170° C., of the formula

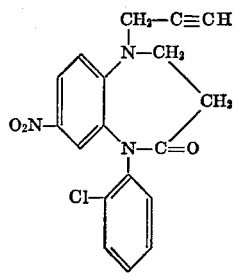

was prepared from 5-(o-chloro-phenyl)-7-nitro-1H-2,3,4,5-tetrahydro-1,5-benzodiazepin-4-one and propargyl chloride.

EXAMPLE 20

Using a procedure analogous to that described in Example 7, 1-(cyclopropyl-methyl)-5-phenyl-7-nitro-1H-2,3,4,5-tetrahydro-1,5-benzodiazepin-4-one, 127° C., of the formula

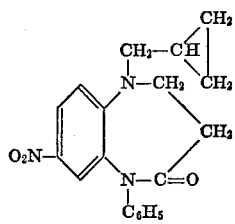

was prepared from 7-nitro-5-phenyl-1H-2,3,4,5-tetrahydro-1,5-benzodiazepin-4-one and cyclopropyl-methyl bromide.

EXAMPLE 21

Using a procedure analogous to that described in Example 1, 1-n-propyl-5-phenyl-7-nitro-1H-2,3,4,5-tetrahydro-1,5-benzodiazepin-4-one, M.P. 125–126° C., was prepared from 7-nitro-5-phenyl-1H-2,3,4,5-tetrahydro-1,5-benzodiazepin-4-one and n-propyl bromide.

EXAMPLE 22

Using a procedure analogous to that described in Example 1, 1-n-propyl-5-phenyl-7-trifluoromethyl-1H-2,3,4,5-tetrahydro-1,5-benzodiazepin-4-one, M.P. 143–145° C., was prepared from 5-phenyl-7-trifluoromethyl-1H-2,3,4,5-tetrahydro-1,5-benzodiazepin-4-one and n-propyl bromide.

EXAMPLE 23

Using a procedure analogous to that described in Example 1, 1-methyl-5-phenyl-7-nitro-1H-2,3,4,5-tetrahydro-1,5-benzodiazepin-4-one, M.P. 123–125° C., was prepared from 7-nitro-5-phenyl-1H-2,3,4,5-tetrahydro-1,5-benzodiazepin-4-one and methyl iodide.

EXAMPLE 24

Using a procedure analogous to that described in Example 1, 1-methyl-5-phenyl-7-trifluoromethyl-1H-2,3,4,5-tetrahydro-1,5-benzodiazepin-4-one, M.P. 91–92° C., was prepared from 5-phenyl-7-trifluoromethyl-1H-2,3,4,5-tetrahydro-1,5-benzodiazepin-4-one and methyl iodide.

EXAMPLE 25

Using a procedure analogous to that described in Example 7, 5-phenyl-7-cyano-1H-2,3,4,5-tetrahydro-1,5-benzodiazepin-4-one, M.P. 175–180° C., of the formula

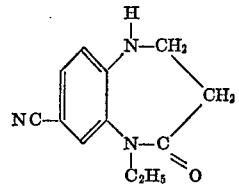

was prepared from 7-cyano-1H-2,3,4,5-tetrahydro-1,5-benzodiazepin-4-one and bromobenzene.

EXAMPLE 26

Using a procedure analogous to that described in Example 7, 5-phenyl-7-hydroxy-1H-2,3,4,5-tetrahydro-1,5-benzodiazepin-4-one, M.P. 192–193° C., of the formula

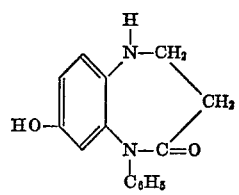

was prepared from 7-hydroxy-1H-2,3,4,5-tetrahydro-1,5-benzodiazepin-4-one and bromobenzene.

EXAMPLE 27

Using a procedure analogous to that described in Example 1, 1-n-hexyl-5-phenyl-7-nitro-1H-2,3,4,5-tetrahydro-1,5-benzodiazepin-4-one, an oil, was prepared from 7-nitro-5-phenyl-1H-2,3,4,5-tetrahydro-1,5-benzodiazepin-4-one and n-hexyl bromide.

EXAMPLE 28

Using a procedure analogous to that described in Example 1, 1-n-butyl-5-phenyl-7-nitro-1H-2,3,4,5-tetrahydro-1,5-benzodiazepin-4-one, M.P. 114–115° C., was prepared from 7-nitro-5-phenyl-1H-2,3,4,5-tetrahydro-1,5-benzodiazepin-4-one and n-butyl bromide.

EXAMPLE 29

Using a procedure analogous to that described in Example 1, 1-cyclohexyl-methyl-5-phenyl-7-nitro-1H-2,3,4,5-tetrahydro-1,5-benzodiazepin-4-one, an oil of the formula

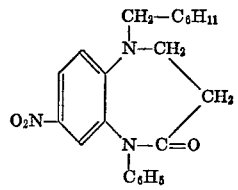

was prepared from 7-nitro-5-phenyl-1H-2,3,4,5-tetrahydro-1,5-benzodiazepin-4-one and cyclohexyl-methyl-bromide.

EXAMPLE 30

Using a procedure analogous to that described in Example 1, 1-methyl-5-phenyl-7-bromo-1H-2,3,4,5-tetrahydro-1,5-benzodiazepin-4-one, M.P. 122–124° C., was prepared from 7-bromo-5-phenyl-1H-2,3,4,5-tetrahydro-1,5-benzodiazepin-4-one and methyl iodide.

EXAMPLE 31

Using a procedure analogous to that described in Example 1, 1-n-propyl-5-phenyl-7-bromo-1H-2,3,4,5-tetrahydro-1,5-benzodiazepin-4-one, M.P. 141–142° C., was prepared from 7-bromo-5-phenyl-1H-2,3,4,5-tetrahydro-1,5-benzodiazepin-4-one and n-propyl bromide.

EXAMPLE 32

Using a procedure analogous to that described in Example 1, 1-n-butyl-5-phenyl-7-bromo-1H-2,3,4,5-tetrahydro-1,5-benzodiazepin-4-one, M.P. 130–131° C., was prepared from 7 - bromo-5-phenyl-1H-2,3,4,5-tetrahydro-1,5-benzodiazepin-4-one and n-butyl bromide.

EXAMPLE 33

Using a procedure analogous to that described in Example 1, 1-n-hexyl-5-phenyl-7-bromo-1H-2,3,4,5-tetrahydro-1,5-benzodiazepin-4-one, M.P. 144–145° C., was prepared from 7 - bromo-5-phenyl-1H-2,3,4,5-tetrahydro-1,5-benzodiazepin-4-one and n-hexyl bromide.

EXAMPLE 34

Using a procedure analogous to that described in Example 1, 1 - isopropyl-5-phenyl-7-bromo-1H-2,3,4,5-tetrahydro-1,5-benzodiazepin-4-one, M.P. 123–124° C., was prepared from 7-bromo-5-phenyl-1H-2,3,4,5-tetrahydro-1,5-benzodiazepin-4-one and isopropyl bromide.

EXAMPLE 35

Using a procedure analogous to that described in Example 1, 1 - n - butyl-5-phenyl-7-trifluoromethyl-1H-2,3,4,5-tetrahydro-1,5-benzodiazepin-4-one, M.P. 88–89° C., was prepared from 5-phenyl - 7 - trifluoromethyl-1H-2,3,4,5-tetrahydro-1,5-benzodiazepin-4-one and n-butyl bromide.

EXAMPLE 36

Using a procedure analogous to that described in Example 1, 1 - methyl-5-(o-nitro-phenyl)-7-chloro-1H-2,3,4,5-tetrahydro-1,5-benzodiazepin-4-one, M.P. 176–178° C., was prepared from 7 - chloro-5-(o-nitro-phenyl)-1H-2,3,4,5-tetrahydro-1,5-benzodiazepin-4-one and methyl iodide.

EXAMPLE 37

Using a procedure analogous to that described in Example 7, 5-phenyl-7-bromo-1H-2,3,4,5-tetrahydro-1,5-benzodiazepin-4-one, M.P. 183–185° C., was prepared from 7-bromo-1H-2,3,4,5-tetrahydro - 1,5 - benzodiazepin-4-one and bromobenzene.

EXAMPLE 38

Using a procedure analogous to that described in Example 1, 1-allyl-5-phenyl-7-bromo-1H-2,3,4,5-tetrahydro-1,5-benzodiazepin-4-one, M.P. 158–160° C., was prepared from 7 - bromo-5-phenyl-1H-2,3,4,5-tetrahydro-1,5-benzodiazepin-4-one and allyl bromide.

EXAMPLE 39

Using a procedure analogous to that described in Example 1, 1-(2'-butenyl)-5-phenyl-7-bromo-1H-2,3,4,5-tetrahydro-1,5-benzodiazepin-4-one, M.P. 129–130° C., was prepared from 7-bromo-5-phenyl-1H-2,3,4,5-tetrahydro-1,5-benzodiazepin-4-one and crotyl bromide.

EXAMPLE 40

Using a procedure analogous to that described in Example 2, 1 - (β-hydroxy-ethyl)-5-phenyl-7-nitro-1H-2,3,4,5-tetrahydro-1,5-benzodiazepin-4-one, M.P. 188–193° C., was prepared from 7-nitro-5-phenyl-1H-2,3,4,5-tetrahydro-1,5-benzodiazepin-4-one and ethylene oxide.

EXAMPLE 41

Using a procedure analogous to that described in Example 2, 1-(β-hydroxy-ethyl)-5-phenyl-7-chloro-1H-2,3,4,5-tetrahydro-1,5-benzodiazepin-4-one, M.J. 155–157° C., was prepared from 7-chloro-5-phenyl-1H-2,3,4,5-tetrahydro-1,5-benzodiazepin-4-one and ethylene oxide.

EXAMPLE 42

Using a procedure analogous to that described in Example 6, 1-formyl-5-phenyl-7-chloro-1H-2,3,4,5-tetrahydro-1,5-benzodiazepin-4-one, M.P. 147–148° C., was prepared from 7-chloro-5-phenyl-1H-2,3,4,5-tetrahydro-1,5-benzodiazepin-4-one and formic acid.

EXAMPLE 43

Using a procedure analogous to that described in Example 6, 1-formyl-5-phenyl-7-trifluoromethyl-1H-2,3,4,5-tetrahydro-1,5-benzodiazepin-4-one, M.P. 141–142, was prepared from 5-phenyl - 7 - trifluoromethyl-1H-2,3,4,5-tetrahydro-1,5-benzodiazepin-4-one and formic acid.

EXAMPLE 44

Using a procedure analogous to that described in Example 6, 1-formyl-5-phenyl-7-nitro - 1H - 2,3,4,5-tetrahydro-1,5-benzodiazepin-4-one, M.P. 190–191° C., was prepared from 7-nitro - 5 - phenyl-1H-2,3,4,5-tetrahydro-1,5-benzodiazepin-4-one and formic acid.

EXAMPLE 45

Using a procedure analogous to that described in Example 6, 1-formyl-5-(o-fluoro-phenyl)-7-chloro-1H-2,3,4,5-tetrahydro-1,5-benzodiazepin-4-one, M.P. 146–147° C., was prepared from 7-chloro-5-(o-fluoro-phenyl)-1H-2,3,4,5-tetrahydro-1,5-benzodiazepin-4-one and formic acid.

EXAMPLE 46

Using a procedure analogous to that described in Example 6, 1-formyl-5-(o-chloro-phenyl)-7-trifluoromethyl-1H-2,3,4,5-tetrahydro - 1,5 - benzodiazepin-4-one, M.P. 143–144° C., was prepared from 5-(o-chloro-phenyl)-7-trifluoromethyl - 1H - 2,3,4,5 - tetrahydro - 1,5 - benzodiazepin-4-one and formic acid.

EXAMPLE 47

Using a procedure analogous to that described in Example 6, 1-formyl-5-(o-nitro-phenyl)-7-chloro-1H-2,3,4, 5-tetrahydro-1,5-benzodiazepin-4-one, M.P. 211–214° C., was prepared from 7-chloro-5-(o-nitro-phenyl)-1H-2,3,4, 5-tetrahydro-1,5-benzodiazepin-4-one and formic acid.

EXAMPLE 48

Using a procedure analogous to that described in Example 1, 5-(o-trifluoromethyl-phenyl)-7-chloro-1H-2,3,4, 5-tetrahydro-1,5-benzodiazepin-4-one, M.P. 132–133° C., of the formula

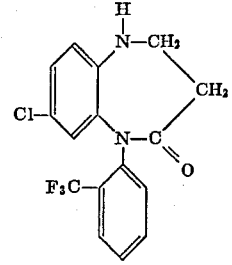

was prepared from 7-chloro-1H-2,3,4,5-tetrahydro-1,5-benzodiazepin - 4 - one and o-trifluoromethyl-chlorobenzene.

EXAMPLE 49

Using a procedure analogous to that described in Example 1, 5-(o-fluoro-phenyl)-7-chloro-1H-2,3,4,5-tetrahydro-1,5-benzodiazepin-4-one, M.P. 159–160° C., was prepared from 7-chloro-1H-2,3,4,5-tetrahydro-1,5-benzodiazepin-4-one and o-difluorobenzene.

EXAMPLE 50

Using a procedure analogous to that described in Example 1, 5-(o-bromo-phenyl)-7-chloro-1H,2,3,4,5-tetrahydro-1,5-benzodiazepin-4-one, M.P. 186–188° C., was prepared from 7-chloro-1H-2,3,4,5-tetrahydro-1,5-benzodiazepin-4-one and o-dibromobenzene.

The compounds according to the present invention, that is, those embraced by formula I and non-toxic, pharmacologically acceptable acid addition salts thereof, have useful pharmacodynamic properties. More particularly, the compounds of the instant invention exhibit sedative and anticonvulsive activities in warm-blooded animals, such as mice.

Moreover, they may be used as intermediates in the production of pharmacologically valuable compounds, especially of tranquilizers as described, e.g. in Belgian Pat. No. 710,475 or U.S. Patent Application Ser. No. 221,046 dealing with 5-substituted 1H-1,5-benzodiazepine-2,4(3H,5H)-diones resp. the corresponding 3-hydroxy compounds.

Especially effective are those compounds of the formula I wherein $R_1$ is hydrogen, formyl, alkyl of 1 to 5 carbon atoms or alkenyl of 1 to 5 carbon atoms, $R_2$ is phenyl or o-chlorophenyl, and $R_3$ is bromine, nitro, cyano or trifluoromethyl.

The sedative and anticonvulsive activity of the compounds according to the present invention was ascertained by means of standard pharmacological tests for sedative and anticonvulsive activities on laboratory mice, as follows:

(A) Sedative activity

The median ataxic dose ($AD_{50}$) was determined, that is, the dose at which the movement of the extremities was no longer cordinated in 50% of the test animals.

(B) Anticonvulsive activity

Tonic spasms were induced in the untreated test animals by means of an electric current applied with eye-electrodes; the intensity of the current was increased until all of the untreated animals responded with tonic spasms (maximum electro-shock). Thereafter, varying doses of the test compound under investigation were administered to the animals, the maximum electro-shock was applied, and the number of animals was determined which exhibited no tonic spasms. From these data, the median anticonvulsive dose ($ED_{50}$) was determined, i.e. the dose which suppressed tonic spasms in 50% of the animals.

(C) Toxicity

The median lethal dose ($LD_{50}$) was determined by the test method of G. Kerber, Arch. exper. Path. u. Pharm., Vol. 162, page 480 (1931).

The test compounds were in all cases administered perorally, and the median doses were calculated graphically.

The following table shows the results of the above tests.

preferably 0.0167 to 0.42 mgm./kg. body weight. The daily dose rate is from 0.083 to 2.5 mgm./kg. body weight.

The following examples illustrate a few dosage unit compositions comprising a compound of the present invention as an active ingredient and represent the best modes contemplated of putting the invention into practical use. The parts are parts by weight unless otherwise specified.

EXAMPLE 48

Coated tablets

The tablet composition was compounded from the following ingredients:

| | Parts |
|---|---|
| 1 - allyl - 5 - phenyl - 7 - bromo - 1H - 2,3,4,5-tetrahydro-1,5-benzodiazepin-4-one | 5.0 |
| Lactose | 28.5 |
| Corn starch | 15.0 |
| Gelatin | 1.0 |
| Magnesium stearate | 0.5 |
| Total | 50.0 |

Preparation.—The benzodiazepinone compound was intimately admixed with the lactose and the corn starch, the mixture was moistened with an aqueous 10% solution of the gelatin, the moist mass was granulated by forcing it through a 1 mm.-mesh screen, and the moist granulate was dried at 40° C. and again passed through a fine-mesh screen. The dry granulate was then admixed with the magnesium stearate, and the composition was compressed into 50 mgm.-tablets, which were subsequently coated in conventional manner with a thin shell with the aid of an aqueous suspension of sugar, titanium oxide, talcum and gum arabic, and polished with beeswax. Each coated tablet contained 5.0 mgm. of the benzodiazepinone compound and, when administered perorally to a warm-blooded animal of about 60 kg. body weight in need of such treatment, produced a very effective sedative (tranquilizing) action.

TABLE

| | Sedative activity | | Anticonvulsive activity | | Toxicity | |
|---|---|---|---|---|---|---|
| | $AD_{50}$, mgm./kg. | No. of animals | $ED_{50}$, mgm./kg. | No. of animals | $LD_{50}$, mgm./kg. | No. of animals |
| End product of Example No.: | | | | | | |
| 18 | 2.0 | 80 | <320 | 120 | >2,900 | 80 |
| 41 | 48 | 70 | 40 | 80 | 550 | 70 |
| 12 | 4.5 | 40 | >280 | 65 | >2,550 | 40 |
| 32 | 6 | 80 | 100 | 110 | 1,900 | 80 |
| 43 | 13 | 75 | 66 | 75 | 3,000 | 75 |
| 44 | 14 | 35 | 311 | 60 | >2,711 | 35 |
| 1 | 15 | 25 | >340 | 45 | >2,950 | 25 |
| 25 | 4 | 40 | 110 | 40 | 745 | 42 |
| 22 | 22 | 20 | 342 | 45 | 3,078 | 00 |
| 23 | 13 | 20 | 200 | 50 | 1,540 | 20 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0083 to 0.84 mgm./kg. body weight,

EXAMPLE 49

Suppositories

The suppository composition was compounded from the following ingredients:

| | Parts |
|---|---|
| 5 - (o - chloro - phenyl) - 7 - nitro-1H-2,3,4,5-tetrahydro-1,5-benzodiazepin-4-one | 5.0 |
| Cocoa butter | 1695.0 |
| Total | 1700.0 |

Preparation.—The cocoa butter was melted and cooled to 40° C., and the finely pulverized benzodiazepinone compound was stirred into it with the aid of an immersion homogenizer. The mixture was cooled to 35° C., and 1700 mgm.-portions thereof were poured into cooled suppository molds. Each suppository contained 5.0 mgm. of the benzodiazepinone compound and, when administered by the rectal route to a warm-blooded animal of about 60 kg. body weight in need of such treatment, produced a very effective sedative (tranquilizing) action.

Analogous results were obtained when an equal amount of any one of the other benzodiazepinones embraced by formula I or a non-toxic acid addition salt thereof was substituted for the particular benzodiazepinone in Examples 48 and 49, especially the following:

1-allyl-5-phenyl-7-nitro-1H-2,3,4,5-tetrahydro-1,5-benzodiazepin-4-one,
1-(2'-butenyl-5-phenyl-7-nitro-1H-2,3,4,5-tetrahydro-1,5-benzodiazepin-4-one,
5-phenyl-7-nitro-1H-2,3,4,5-tetrahydro-1,5-benzodiazepin-4-one,
1-($\beta$-hydroxy-ethyl)-5-phenyl-7-chloro-1H-2,3,4,5-tetrahydro-1,5-benzodiazepin-4-one,
5-($\gamma$-hydroxy-propyl)-7-chloro-1H-2,3,4,5-tetrahydro-1,5-benzodiazepin-4-one,
1-formyl-5-phenyl-7-trifluoromethyl-1H-2,3,4,5-tetrahydro-1,5-benzodiazepin-4-one,
1-formyl-5-phenyl-7-nitro-1H-2,3,4,5-tetrahydro-1,5-benzodiazepin-4-one, and
1-allyl-7-bromo-5-phenyl-1H-2,3,4,5-tetrahydro-1,5-benzodiazepin-4-one.

Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

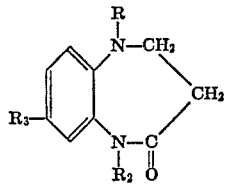

wherein
$R_1$ is hydrogen, acyclic hydrocarbyl of 1 to 6 carbon atoms, $\omega$-hydroxy-alkyl of 2 to 3 carbon atoms, cycloalkyl of 3 to 6 carbon atoms—methyl or formyl,
$R_2$ is $\alpha$-pyridyl, phenyl, o-halo-phenyl, o-nitro-phenyl or o-trifluoromethyl-phenyl, and
$R_3$ is bromine, hydroxyl, trifluoromethyl, nitro, cyano or, when $R_1$ is $\omega$-hydroxy-alkyl of 2 to 3 carbon atoms or formyl or, when $R_2$ is o-fluorophenyl, o-bromophenyl, o-nitrophenyl, o-trifluoromethylphenyl or $\alpha$-pyridyl, also chlorine,
or a non-toxic, pharmacologically acceptable acid addition salt thereof.

2. A compound according to claim 1, wherein
$R_1$ is hydrogen, acyclic hydrocarbyl of 1 to 5 carbon atoms or formyl,
$R_2$ is phenyl or o-halo-phenyl, and
$R_3$ is bromine, trifluoromethyl, nitro or cyano,
or a non-toxic, pharmacologically acceptable acid addition salt thereof.

3. A compound according to claim 2, which is 7-nitro-5-phenyl - 1H-2,3,4,5-tetrahydro-1,5-benzodiazepin-4-one or a non-toxic acid addition salt thereof.

4. A compound according to claim 2, which is 1-allyl-7-nitro - 5 - phenyl-1H-2,3,4,5-tetrahydro-1,5-benzodiazepin-4-one or a non-toxic acid addition salt threof.

5. A compound according to claim 2, which is 7-nitro-5-(2'-chloro-phenyl)-1H - 2,3,4,5 - tetrahydro-1,5-benzodiazepin-4-one or a non-toxic acid addition salt thereof.

6. A compound according to claim 2, which is 1-(2'-butenyl)-7-nitro - 5 - phenyl - 1H - 2,3,4,5-tetrahydro-1,5-benzodiazepin-4-one or a non-toxic acid addition salt thereof.

7. A compound according to claim 2, which is 1-formyl - 5 - phenyl - 7 - trifluoromethyl-1H-2,3,4,5-tetrahydro-1,5-benzodiazepin-4-one.

8. A compound according to claim 2, which is 1-formyl-5-phenyl - 7 - nitro-1H-2,3,4,5-tetrahydro-1,5-benzodiazepin-4-one.

References Cited
UNITED STATES PATENTS 3,321,468  5/1967  Krapcho et al. ---- 260—239.3 B
3,341,521  9/1967  Bernstein -------- 260—239.3 B

OTHER REFERENCES

Ittyerah et al. "J. Chem. Soc.," pp. 467–480 (1958) (see in particular pp. 470, 471 and 477).

Nicolaus et al. "Helv. Chim. Acta.," vol. 48, pp. 1867–1885 (1965).

HENRY R. JILES, Primary Examiner

R. T. BOND, Assistant Examiner

U.S. Cl. X.R.
424—244, 263

PO-1050
(5/69)

UNITED STATES PATENT OFFICE
CERTIFICATE OF CORRECTION

Patent No. 3,816,409        Dated June 11, 1974

Inventor(s) ADOLF BAUER, KARL HEINZ WEBER, HERBERT MERZ, KARL ZEILE, ROLF GIESEMANN, PETER DANNEBERG It is certified that error appears in the above-identified patent and that said Letters Patent are hereby corrected as shown below:

Col. 9 line 12, that portion of the formula which now reads:

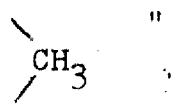
"should read

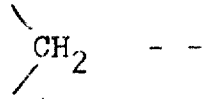

Col. 10 line 13, that portion of the formula which now reads:

"$C_2H_5$"        should read

-- $C_6H_5$ --

Col. 15 line 47, that portion of the formula which now reads:

" R "        should read

-- $R_1$ --

Signed and sealed this 5th day of November 1974.

(SEAL)
Attest:

McCOY M. GIBSON JR.
Attesting Officer

C. MARSHALL DANN
Commissioner of Patents

Notice of Adverse Decision in Interference

In Interference No. 100,233, involving Patent No. 3,816,409, A. Bauer, K. H. Weber, H. Merz, K. Zeile, R. Giesemann and P. Danneberg, 5-(PYRIDYL OR PHENYL)-1H-2,3,4,5-TETRAHYDRO-1,5-BENZODIAZEPIN-4-ONES AND SALTS THEREOF, final judgment adverse to the patentees was rendered Dec. 19, 1979, as to Claim 1.

[*Official Gazette, April 29, 1980.*]